Sept. 1, 1936.  W. L. McNAMARA  2,052,578
GLASS FEEDER AND METHOD
Filed Oct. 24, 1931   5 Sheets-Sheet 1

INVENTOR
William L. McNamara
BY Norman V. Holland
ATTORNEY

Sept. 1, 1936.  W. L. McNAMARA  2,052,578
GLASS FEEDER AND METHOD
Filed Oct. 24, 1931  5 Sheets-Sheet 3

INVENTOR
William L. McNamara
BY
Norman T. Holland
ATTORNEY

Sept. 1, 1936.  W. L. McNAMARA  2,052,578
GLASS FEEDER AND METHOD
Filed Oct. 24, 1931   5 Sheets-Sheet 4

INVENTOR
William L. McNamara
BY
Norman N. Holland
ATTORNEY

Patented Sept. 1, 1936

2,052,578

UNITED STATES PATENT OFFICE 2,052,578

GLASS FEEDER AND METHOD

William L. McNamara, Connellsville, Pa., assignor to Capstan Glass Company, Connellsville, Pa., a corporation of Pennsylvania Application October 24, 1931, Serial No. 570,833

29 Claims. (Cl. 49—55)

The present invention relates to glass feeding devices, and more particularly to a glass feeder and method of feeding molten glass to fabricating machines and the like.

With the development of automatic glass machinery for molding containers of various shapes and sizes, glass feeders have been developed for delivering charges of glass to the fabricating machines. The most popular type of feeder comprises, generally, a flow spout extending from the side wall of a glass furnace adapted to receive and retain a shallow pool of molten glass, a delivery orifice in the bottom of the spout, and a needle adapted to be reciprocated above the orifice to deliver successive charges of glass of suitable size and shape to the fabricating machines. Due to unavoidable changes in conditions of the molten glass in the feeder spout, there is a tendency for the charges delivered to vary in weight from time to time, which, of course, affects the weight of the molded article. The requirement as to weight of the latter is very rigid, and various devices have been devised for regulating the weight of the charges delivered so that the weight of the resulting molded ware will be within the prescribed limits. Many of these devices involve very complicated mechanisms with which even expert mechanics have constant difficulty, and none of them is entirely satisfactory.

An object of the present invention is to provide a novel and simple machine and method for accurately regulating the weight of the charges delivered to keep the weight of the molded articles substantially constant, and within the prescribed limits of variation in the weight of the molded article.

Another object of the invention is to simplify the means and method of regulating the weight of glass charges delivered by a feeder.

Another object of the invention is to provide a simple means and method for controlling the operation of the feeder.

Another object of the invention is to provide an accurate means and method of regulating the heat applied to the glass in the feeder spout, thereby to minimize the changes in the condition of the glass and the resulting variations in the weight of the charges delivered.

Another object of the invention is to provide convenient, simple and accurate means of changing the amount of heat applied to the glass in the feeder spout in very small increments.

Another object of the invention is to provide a plurality of regulating means for controlling the weight of the glass delivered, one of which is adapted to effect very slow changes in the weight of the charges delivered, and another of which is adapted to effect very rapid changes in the weight of the glass charges delivered.

Another object of the invention is to increase the rate of production of glass feeders and fabricating machines by minimizing the changes necessary for regulating the weight of the charges delivered, and simplifying the mechanisms for effecting the infrequent changes.

A further object of the invention is the provision of simplified means for operating the needle and shear mechanisms forming a part of the glass feeder, and to provide simple means of adjusting the needle and shears, particularly during the change-over from one size and shape of ware to another.

Other and further objects of the invention will be obvious upon an understanding of the illustrated embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, wherein Fig. 1 is a longitudinal sectional view of a glass feeder showing the feeder spout and charge feeding mechanism;

Described generally, an apparatus illustrating a preferred embodiment of the invention may comprise a spout extending from the usual glass furnace having an orifice at the bottom thereof through which the glass charges are delivered. A suitable needle is mounted in alignment with the orifice and reciprocated vertically to expel charges of glass from the orifice at predetermined intervals. The needle is held in proper alignment above the outlet orifice at all times and is reciprocated in a vertical plane by means of a suitable cam and lever mechanism. Another cam and lever mechanism, driven from a common source of power, operates a pair of shears beneath the outlet orifice for severing the stream of glass as the successive charges are formed and suspended beneath the outlet. The position of the shears, as well as the position of the needle, may be adjusted to and from the outlet orifice if desired.

A suitable motor is adapted to drive the needle operating mechanism, the shears and fabricating machine, and in some cases the motor drive may be utilized to control and time the operation of the fabricating machine. When the operator observes that the weight of the glass charges delivered are approaching the prescribed limit of variation, it is necessary to make a rapid change to bring the charges to the proper weight. In the present embodiment, this may be obtained either by adjusting the position of the needle or by changing the speed of the driving motor which controls the speed of the needle, the shears and the fabricating machine. The speed of the motor should be adjustable so that the speed thereof may be changed accurately in small increments. A decrease in the speed will increase the size of the charges of glass by permitting the flow to continue longer for each charge, likewise, an increase in the speed of the motor will decrease the size of the charges delivered. In addition to these adjustments to make rapid changes in the weight of the glass delivered, it is desirable to correct the causes of the irregularities, which are, usually, the changes in the temperature of the glass. Since glass is a relatively poor conductor of heat, temperature changes are relatively slow, hence when the speed of the machine has been increased or decreased a predetermined amount, the heat applied to the glass by means of burners is increased or decreased to maintain the glass at its proper temperature and to permit the speed of the machine to be brought back to its normal or desired rate.

Figure 1:
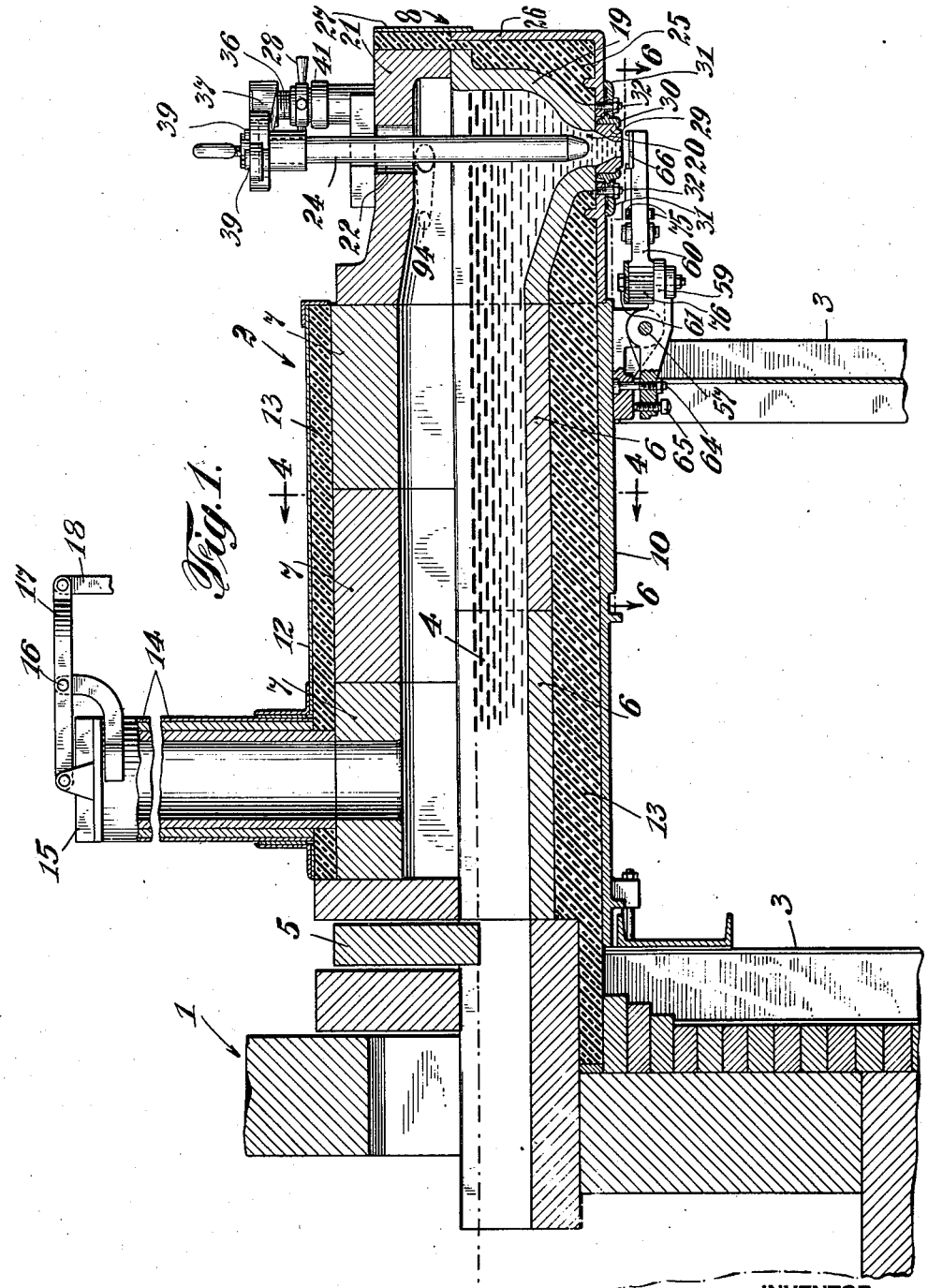
Figure 2:
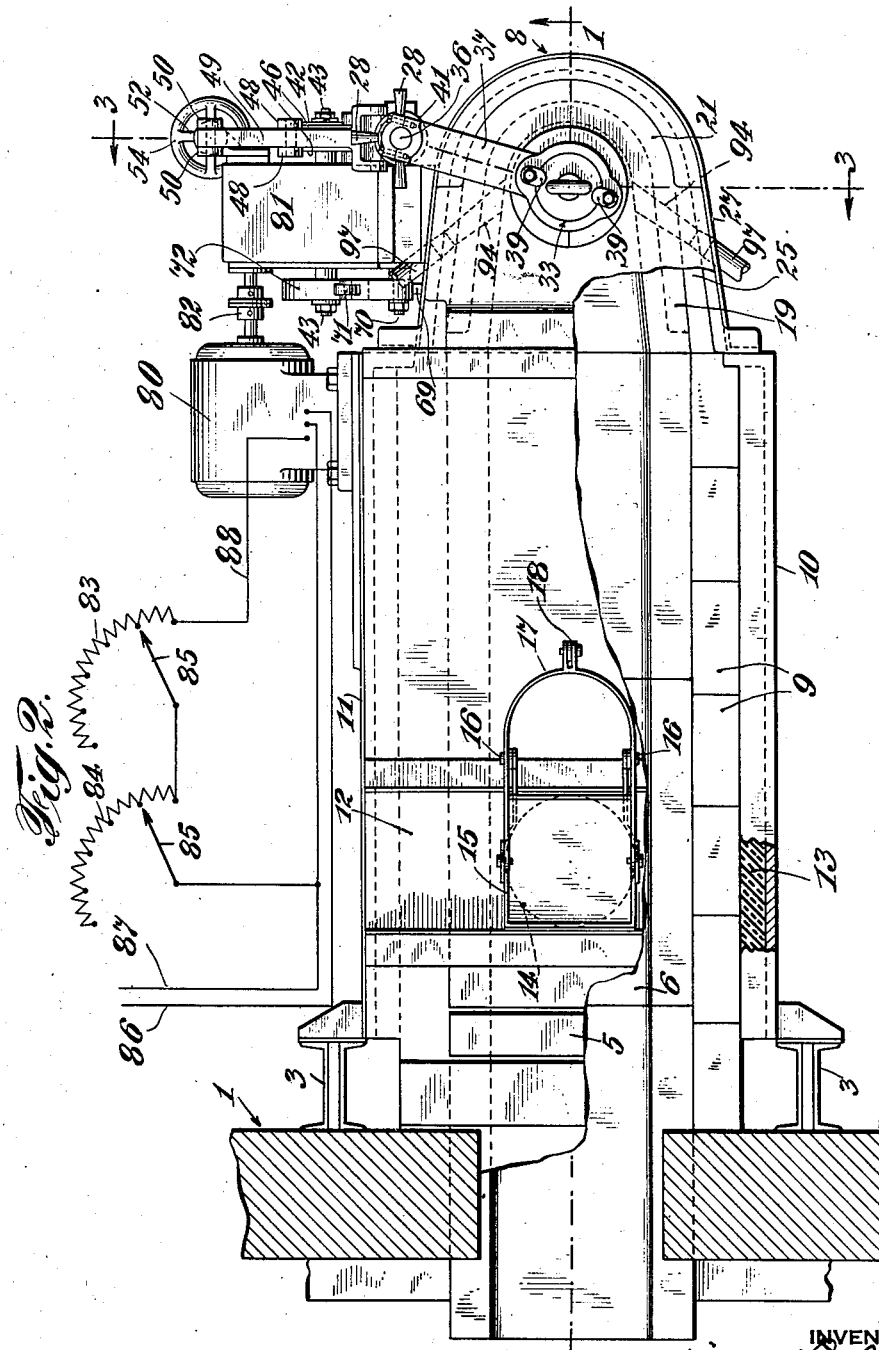
Fig. 2 is a top plan view, partly in section, of the feeder spout and mechanism for feeding the charges of glass.

While there are various forms of apparatus for practicing the method described herein, a preferred embodiment of the invention has been chosen for purposes of illustration and description, and to illustrate one way of practicing the method. Referring again to the drawings and more particularly Figs. 1 and 2, there is shown the usual glass furnace 1 having a spout 2 projecting therefrom supported upon suitable standards 3 which are adjustable in height to hold the outer end of the spout at a proper elevation with respect to the furnace construction so that the glass 4 will flow from the furnace into the spout and maintain a substantially constant level therein. Preferably, a vertically movable gate 5 is interposed at the junction of the spout and furnace to skim off the undesirable upper surface of the glass and to prevent impurities from entering the spout. In some cases, the gate 5 may be spaced slightly from the surface of the glass, but preferably it extends downwardly into the glass.

Figure 4:
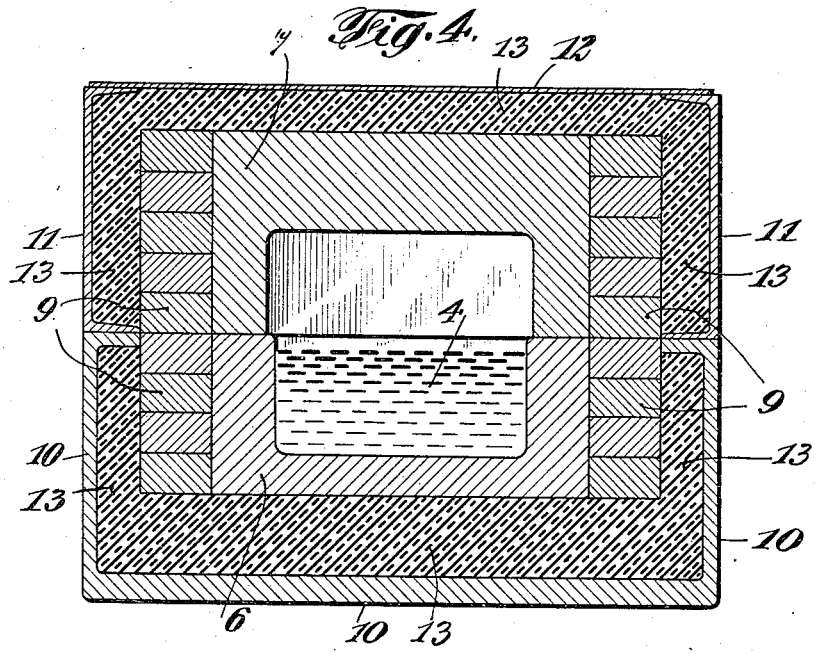
Fig. 4 is a sectional view along the lines 4—4 of Fig. 1.

Any suitable construction may be utilized for the spout, but as shown herein (see Fig. 4), a lower channel member 6 is provided and has a series of inverted channel members 7 closing the upper side thereof to provide an enclosed channel leading to the nose 8 of the spout. The exterior of the channel may be insulated by means of any suitable material such as insulation brick 9 and asbestos lining 13 or the like, which in turn is enclosed by a lower supporting channel member 10, side channel members 11 and a sheet of metal 12. A stack 14 may be provided at the furnace end of the spout with a cover 15 pivoted at 16 and adjustably held in position by means of levers 17 and 18 for regulating the draft in the spout.

The nose 8 closing the end of the spout may comprise a bottom refractory bowl or member 19 having an aperture 20 at the bottom thereof. A refractory cover member 21 may be fitted upon the top of the bowl 19 and has an aperture 22 therein through which a needle 24 projects. Suitable insulation 25 may be placed between the refractory members 19 and 21 and members 26 and 27, encasing the nose of the spout.

A suitable bushing 29 may be removably mounted adjacent the outlet orifice 20 by means of ring 30 and the clamping members 31 held in place by the bolts 32. The purpose of the bushing is to form a continuation of the orifice 20, generally of reduced diameter so that the bushing may be removed and replaced to adjust the size of the orifice to correspond with the type and size of ware being fabricated.

While various mechanisms may be utilized for mounting the needle 24, the preferred embodiment shown in the drawings utilizes a sleeve 34 mounted adjacent to the casing 26 which serves as a guide for a shaft 35 extending through the sleeve. The shaft 35 has a threaded bore therein adapted to receive a second shaft 36 which is threaded to cooperate with the threads in the bore of the shaft 35. An arm 37 is secured to the upper end of the shaft 36 by a bolt 38 and extends over the aperture 22 to support the needle 24. The needle may be secured to the arm 37 in any suitable manner. As shown, the upper end of the needle is shaped to fit into a recess 33 at the end of the arm and is held in position by clamp members 39 secured to the arms by means of suitable bolts.

For the purpose of adjusting the needle vertically, there is provided a threaded collar 40 in engagement with the threaded shaft 36 and rotatably mounted on the shaft 35 by means of a collar 41 threaded to the shaft 35. A hand wheel 28 facilitates rotation of the collar 40 which in turn raises and lowers the threaded shaft 36 and the needle 24 with respect to the shaft 35.

Preferably, the needle 24 is operated by means of a cam 42 secured to a cam shaft 43 by means of bolts 44. The cam 42 operates the needle through the intermediation of a cam roller 45 on lever 46 pivoted to the sleeve 34 at 47, and link 48 pivoted to lever 49, which in turn is pivotally attached to a link 50 connected to a shaft 51 which passes through and is supported by two sleeves 52 and 53, and is threaded with the lower sleeve 53. A hand wheel 54, attached to the shaft 51, is adapted to raise and lower the fixed end of the lever 49 to adjust the needle toward and away from the outlet orifice 20. By moving the shaft 51 upwardly, the needle 24 reciprocates closer to the orifice and downward movement of the shaft 51 makes the needle reciprocate at a further distance from the orifice. In this manner, the size of the charges may be regulated to any desired extent, because the nearer the needle operates to the orifice 20, the more glass is forced out since there is less chance for the glass to pass around the needle.

Figure 6:
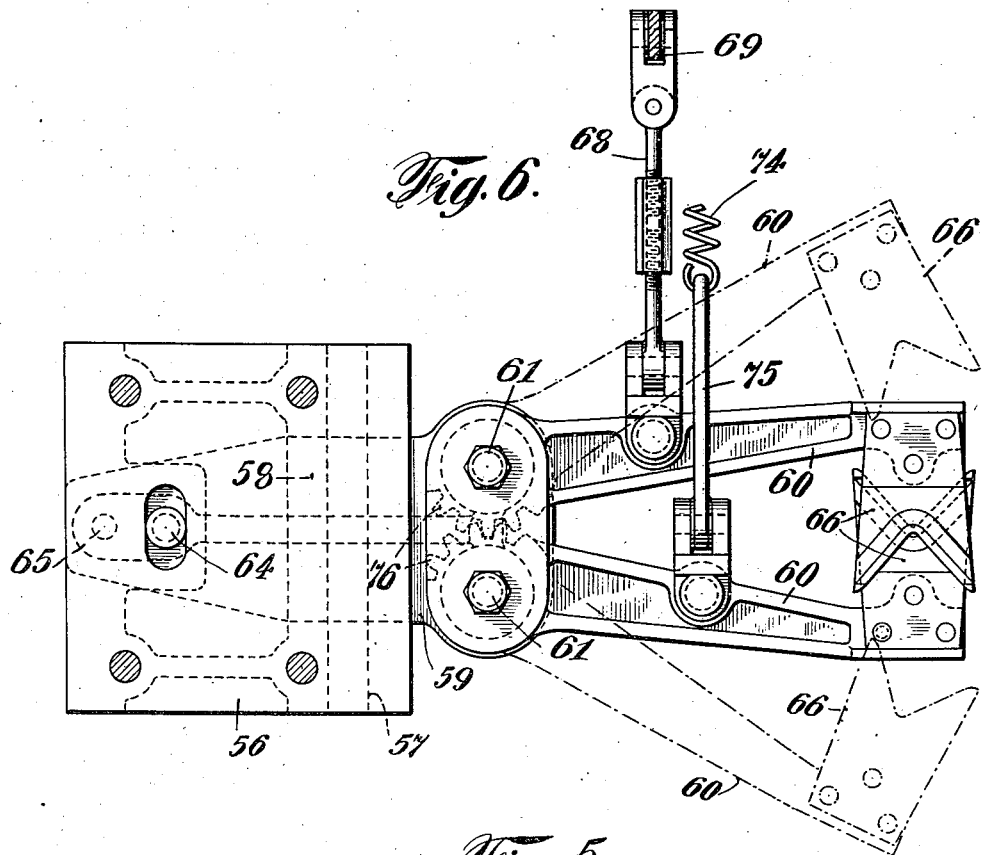
Fig. 6 is a sectional view along the lines 6—6 of Figs. 1 and 5.
Figure 5:
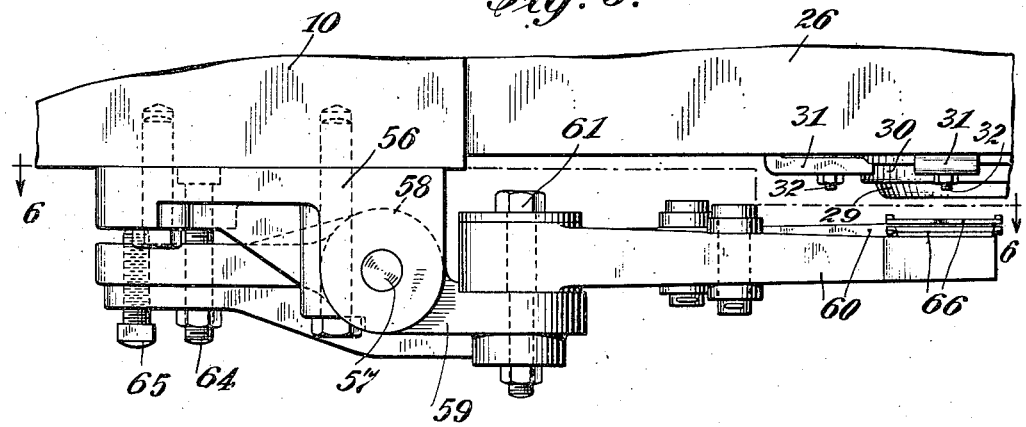
Fig. 5 is a side elevational view of the shearing mechanism illustrating the mounting and adjustment thereof.

A suitable shearing mechanism for shearing the charges of glass suspended from the orifice may be pivoted upon a bracket 56 mounted adjacent to the lower casing 26 of the spout (see Figs. 5 and 6). A shaft 57 extends through a suitable bearing 58 in a supporting member 59, and the shear blades 60 are mounted in suitable bearings in the supporting member 59 by means of bolts 61 so that the shear blades may be oscillated in a horizontal plane to sever the stream of glass. The opposite end of the supporting member 59 is held in position by means of a pair of bolts 64 and 65, which permit the member 59 to be rotated about the shaft 57 and fixed in any desired position. This in turn moves the shear blades up and down with respect to the outlet orifice 20 so that the shears may operate in any desirable plane. While the shears may be of any suitable construction, preferably the cutting parts 66 of the blades are V-shaped so that the tendency to displace the stream of glass from its natural line of flow is minimized.

Figure 3:
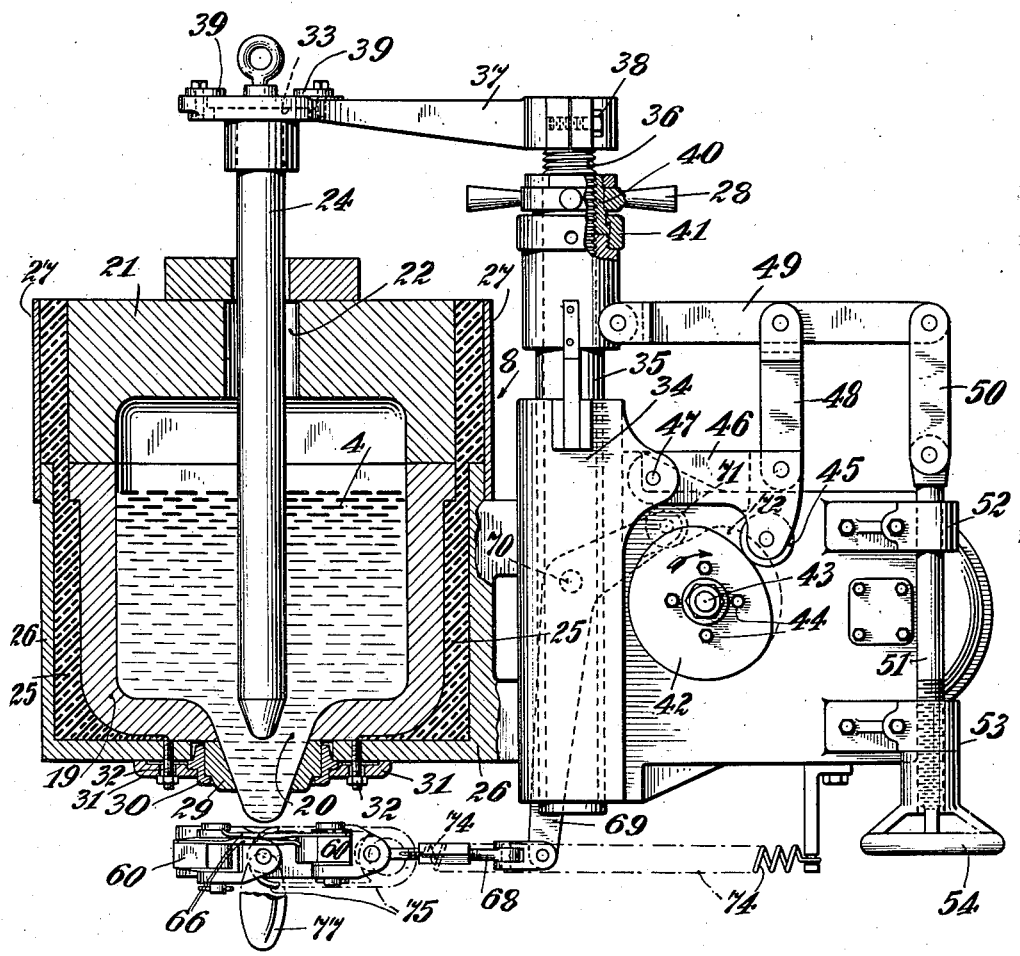
Fig. 3 is a sectional view along the lines 3—3 of Fig. 2.

Any suitable means may be utilized for operating the shear blades, but as illustrated herein, an adjustable link 68 is pivotally connected to a bell crank lever 69 pivoted at 70 and having a cam roller 71 engaging a cam 72 mounted upon the drive shaft 43. A spring 74 operating through link 75 attached to one of the shear blades tends to retain the shear blades in closed position and to hold the cam roller against the cam 72. The shear blades 60 are operatively connected to each other through the gears 76, as illustrated more particularly in Fig. 6. The charges of glass 77 from the flowing stream fall into suitable molds on the fabricating machine 78, (Fig. 3) which may be any convenient distance below the shearing mechanism.

The drive shaft 43 is preferably operated by means of an electric motor 80 through the intermediation of a reduction gear 81, and a coupling 82. The motor 80, in addition to operating the shears and the needle, also operates, or at least times, the fabricating machine 78 so that the needle, the shears and the fabricating machine will all be operated in synchronous relation to each other. The present invention contemplates a very accurate speed control for the motor 80 which is adapted to increase or decrease the speed of the motor in very small increments, thereby increasing or decreasing the weight of the charges fed to keep the fabricated articles within the prescribed limits of variation. For this purpose there is provided a pair of rheostats 83 and 84 to secure accurate adjustments in the speed of the motor in small increments (see Fig. 2). Preferably, one of the rheostats is adapted to adjust the speed in relatively large increments while the other is adapted to make relatively small adjustments so that by the combination of the two rheostats the speed of the motor may be changed sufficiently to effect any desired change. These adjustments are accurate regardless of how small or how large the size of the charges delivered. The rheostats are adjusted in the usual way and suitable pointers 85 indicate their position. Likewise, the rheostats are preferably connected in series with the field circuit 88 of the motor, while the field circuit is connected through the rheostat to the power line 86 outside of the motor and to the power line 87 inside of the motor.

Figure 7:
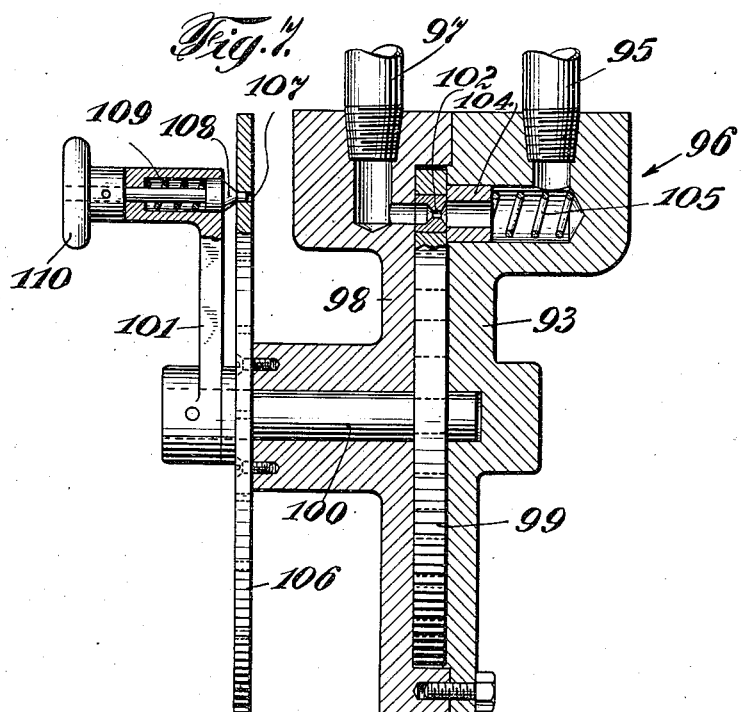
Fig. 7 is a sectional view of the mechanism for controlling the amount of fuel delivered to the burner to regulate the temperature of the molten glass in the flow spout.

By means of the speed control or by use of the hand wheels 28 and 54, the weight of the charges fed may be changed instantaneously, but such a change indicates, particularly where it is substantial, that the condition of the glass in the spout is not satisfactory. The present invention contemplates a very accurate burner control to permit the amount of heat applied to the glass in the spout to be changed from time to time in very small increments to keep the glass at the same temperature and in the same operating conditions at all times. For this purpose, a pair of burners 94 are provided which are inserted through the side walls of the spout adjacent the needle thereof, so that the flame is most effective on the glass adjacent the outlet (see Figs. 1, 2 and 7). In its path to the stack 14, the flame passes over the surface of the glass and is effective on all the glass in the spout. The fuel to the burner is delivered from a suitable source by a pipe or conduit 95 and passes through a control mechanism 96 into a conduit or pipe 97 leading to the burners 94. The control mechanism 96, shown in Fig. 7, preferably comprises a member or plate 93 bolted to another member 98 with a disc 99 therebetween. The disc 99 is mounted upon a shaft 100 which has an arm 101 for rotating the disc 99. The disc 99 is provided with a series of apertures 102 which are very accurately drilled and graduated in size, so that upon rotation of the disc in one direction, the apertures presented to register with the gas inlet, will decrease in size and when rotated in the opposite direction will increase in size. A member 104, held in place by the spring 105, tends to maintain a tight fit between the parts and to prevent the escape of gas.

To avoid the improper registry of the apertures 102 with the conduits, there is provided a plate 106 bolted to the member 98, having apertures 107 therein adapted to seat a pin 108. A spring 109 presses the pin against the apertures to hold the disc 99 in proper position. To move the disc from one position to another, the handle 110 is pulled out to disengage the pin 108 from the apertures 107, and the arm 101 is rotated to increase or decrease the burner opening to make the desired change. It will be understood, however, that the apertures 107 are properly marked so that the operator knows exactly the size of aperture registering with the gas conduit. In addition to controlling the fuel to the burner, the draft control may be regulated by adjusting the damper or cover 15 on the stack 14.

In the operation of the feeder, the gate 5 is adjusted to hold back the upper surface of the glass. The furnace, being large as compared with the spout, provides a substantially constant level of glass in the spout. The motor 80 rotates continuously and drives the cam shaft 43 through the speed reducing mechanism 81. The cam 42 on the cam shaft 43 reciprocates the needle 24 vertically over the orifice 20 by means of the levers 46, 48 and 49, sleeve 34, and arm 37. The position of the needle relative to the orifice may be changed up or down by means of the hand wheel 28 which adjusts the needle with respect to the sleeve 34, or by means of the hand wheel 54 which adjusts the position of one end of the lever 49. The cam 72, on the cam shaft 43, is operatively connected to the shearing mechanism by means of cam roller 71, bell crank 69 and the adjustable link 68. The shears may be moved up or down by means of the bolts 64 and 65. The shear blades 60 are geared to each other as shown more particularly in Fig. 6, so that the operation of one blade by means of the link 68 likewise operates the other. The motor 80 also drives or times the operation of the fabricating machine 78. In this way, the needle, the shears and the fabricating machine are always kept in the same timed relation with respect to each other. However, by changing the speed of the motor 80, the speed of these three mechanisms is changed accordingly. Changing the speed of the needle and shear operations will, of course, change the weight of the glass delivered, and, in this way the weight may be regulated to any desired extent. In order to keep the speed of the machine at its desired operating rate so that production is not materially affected by the slight changes in speed, the burners 94 are provided for heating the glass in the spout. The fuel delivered to these burners is accurately controlled by means of the mechanism shown in Fig. 7, and by rotating the disc 99 through the handle 110, the temperature of the glass in the spout may be increased or decreased so that its proper working condition is maintained, and the speed of the machine is kept normal.

It will be understood, of course, that the regulation of the weight of the charges may also be made, if desired, by changing the position of the needle with respect to the outlet orifice.

During change-overs from one size and shape of ware to another, it is usually customary to change the orifice bushing 29 by removing the clamping members 31 and by substituting another orifice bushing having an outlet orifice therein of the proper size to give the weight of glass desired. At the same time the position of the needle may be changed to give the proper operating characteristics. In some cases, also, it may be desirable to substitute a new cam for the needle operating cam 42. These changes may be rapidly made by merely removing the bolts holding the cam. The operator ordinarily knows the shape of cam desirable for any particular type of ware and the proper cam may be readily substituted in changing over from one type of ware to another.

It will be seen that the present invention provides a very effective method and machine for feeding glass charges to fabricating machines by accurately regulating the speed of the driving motor which controls the needle operation, the shear operation and the operation of the fabricating machine. In this manner, the weight of the glass charges delivered may be controlled accurately. The change of speed necessary seldom exceeds two per cent above or below normal speed, and by increasing or decreasing the fuel applied to the burners effective upon the glass in the spout, the condition of the glass is maintained constant and the machine is operated at its normal speed except for short intervals of time. The present method and means for controlling the weight of the glass charges delivered are extremely accurate, and eliminate the complicated controls heretofore required in this connection. The operator inspects and weighs the glass articles every few minutes, and if the weight varies from the standard, a suitable adjustment of the speed of the motor 80 is made to correct this.

In view of the fact that the operating conditions of molten glass change very slowly, changes in speed are seldom made within intervals of less than fifteen minutes of each other. In some cases, the machine will run for an hour or more without any adjustment whatever. The simplicity and accuracy of the control for the present feeder is a marked advancement in the art. The feeder is entirely mechanical and likelihood of repair and adjustment is reduced to a minimum. The feeder is fully capable of standing the rough usage to which it may be subjected, and may be readily operated by unskilled laborers.

As various changes may be made in the form, arrangement and construction of the various parts without departing from the spirit of the invention, it is to be understood that all matter herein is to be interpreted as illustrative and not in a limiting sense.

Having thus described my invention, I claim:

1. In a device of the class described, the combination of a feeder spout having an orifice therein, a needle adapted to be reciprocated above said orifice, a sleeve mounted in substantially parallel relationship with said needle, members in said sleeve adapted to be reciprocated, said members being adjustable with respect to each other to change their effective length and the position of the needle, means attached to said member adapted to support said needle, and means for reciprocating said member.

2. In a device of the class described, the combination of a feeder spout having an orifice therein, a pair of shears mounted below said orifice, and a pair of opposed bolts effective upon both of said shears adapted to adjust the vertical position of said shears simultaneously to change the plane of shearing without changing the position of the shears with respect to each other.

3. In a device of the class described, the combination of a feeder spout having an orifice therein, a shaft extending substantially horizontally beneath said spout, a pair of shears pivoted on said shaft, and a single pair of bolts for adjusting the vertical position of said shears about said pivot to change the plane of shearing.

4. In a device of the class described, the combination of a feeder spout, a pair of shears geared to each other and mounted beneath said spout, resilient means attached to one of said shears tending to retain said shears in closed position, an adjustable arm, attached to one of said shears, and cam operated means connected to said adjustable arm for operating said shears.

5. In a device of the class described, the combination of a receptacle for delivering charges of molten glass, a burner for controlling the temperature of the glass in said receptacle, a fuel conduit leading to said burner, a plate having a series of apertures therein operatively associated with said conduit to control the weight of the charges delivered by controlling accurately the fuel passing through said conduit.

6. In a device of the class described, the combination of a receptacle for delivering charges of glass, a burner for controlling the temperature of the glass in said receptacle, a rotating disc having a series of accurately gauged apertures therein for regulating the weight of the charges delivered by controlling the supply of fuel to said burner, and means for rotating said disc to increase or decrease the amount of fuel delivered to said burner thereby to regulate the weight of charges delivered.

7. In a device of the class described, the combination of a receptacle for delivering charges of molten glass, a burner for controlling the temperature of said molten glass, a conduit leading to said burner devices for controlling the weight of the charges of glass delivered comprising, a rotatable disc having accurately gauged apertures therein associated with said conduit for controlling the amount of fuel passing therethrough, a second disc having a plurality of apertures therein, an arm for rotating said first disc to control the amount of fuel delivered to said burner, and a member resiliently retained against said second disc to engage the apertures therein, thereby to position the desired aperture in the first disc to register with said conduit.

8. In a device of the class described, the combination of a feeder spout having a delivery orifice therein, a burner for controlling the temperature of glass in said spout, a fuel conduit leading to said burner, a disc having accurately gauged apertures therein adapted to control the fuel passing through said conduit by selection of the proper size of aperture to register therewith, and a stack adapted to regulate the draft in said spout for co-operating with said burner in regulating the temperature of the glass and in accurately controlling the weight of the glass charges being delivered.

9. A device of the class described for feeding charges of glass of substantially constant weight, the combination of a glass feeder, a fabricating machine adapted to receive the charges of glass delivered by said feeder, a motor for driving said feeder and said fabricating machine, means for accurately changing the speed of said motor in small increments to regulate the weight of the glass delivered by said feeder, a burner for controlling the temperature of the glass being delivered, and a fuel control for said burner adapted to change the amount of fuel delivered to the burner in small increments when the speed of the feeder varies materially from its proper speed, thereby to co-operate with said speed changing device for accurately controlling the weight of the charges of glass delivered without substantial changes in speed.

10. The method of feeding glass charges of substantially constant weight, as required commercially, which method comprises maintaining the relative time sequence of the several operations of the feeder, and changing the speed of the feeder operations in small increments to regulate accurately the weight of the charges delivered.

11. The method of maintaining the weight within commercial limits of charges delivered by glass feeders, which method comprises maintaining the same phase operating relation between the several operating mechanisms of the feeder, and changing the speed of the said several operating mechanisms in small increments to regulate accurately the weight of the glass delivered.

12. The method of maintaining substantially constant the weight of glass delivered by glass feeders, which method comprises operating the several parts of the feeder mechanism and the fabricating machine from a common drive, and maintaining the weight of the glass delivered substantially constant by changing the speed of said drive in small increments.

13. The method of maintaining the weight of glass delivered by a needle feeder within commercial limits, which method comprises varying the speed of operation of the glass feeder in small increments to maintain the weight of the glass delivered substantially constant, applying a flame to the glass to regulate the temperature thereof, and accurately controlling the fuel delivered to said flame by incremental changes in the amount thereof for regulating the temperature of the glass.

14. The method of maintaining the weight of the glass delivered by needle feeders within commercial limits of variation, which method comprises applying heat to said glass to regulate the temperature thereof and controlling, by incremental changes in the fuel supplied, the amount of heat applied to effect slow changes in the weight of the glass charges delivered, and regulating in small increments the speed of the glass feeder to make relatively rapid changes in the weight of the charges of glass delivered.

15. In a device of the class described, the combination of a feeder spout having an orifice therein, a needle mounted above said orifice, a threaded member substantially parallel to said needle, an arm attached to said threaded member for supporting said needle, means adapted to reciprocate said threaded member, a threaded column attached to said means for adjustably mounting said threaded member thereon to adjust the position of the needle supporting arm and, a sleeve adapted to receive and support said means and to permit reciprocation thereof.

16. In a device of the class described, the combination of a feeder spout having an orifice therein, a needle mounted above said orifice, a threaded member substantially parallel to said needle, an arm attached to said threaded member and adapted to support said needle, a hollow member adapted to receive said threaded member, a collar secured to the end of said hollow member and in threaded engagement with said threaded member whereby the collar may be rotated to change the combined effective length of said threaded member and said hollow member, a sleeve for guiding said hollow member in its vertical reciprocation, and means attached to said hollow member for reciprocating it.

17. In a device for feeding glass charges of substantially constant weight, the combination of a glass feeder, a fabricating machine adapted to receive the charges of glass delivered by said feeder, a motor for driving said feeder and said fabricating machine and for maintaining the operations of said motor and said feeder in the same phase relation, devices for regulating the weight of the charges delivered comprising a pair of rheostats operatively connected in series for accurately changing the speed of said motor in small increments to regulate the weight of the glass delivered by said feeder, a burner for controlling the temperature of the glass in said spout, a fuel conduit leading to said burner, a disc having accurately gauged apertures therein adapted to control the fuel passing through said conduit by the selection of the proper size of aperture to register therewith, whereby said disc may be rotated to change the amount of fuel fed to said burner in small increments and thereby permitting said feeder to operate at its proper speed.

18. In a device of the class described, the combination of a glass feeder, a fabricating machine adapted to receive the charges of glass delivered by said feeder, a common means for driving said feeder and said fabricating machine and maintaining their operations in the same phase relationship, means for accurately changing the speed of said driving means in small increments to make relatively rapid changes in the weight of the glass delivered to maintain said weight substantially constant, and a burner for controlling the temperature of the glass being delivered, a rotating disc having accurately gauged apertures therein for controlling the amount of fuel delivered to said burner, whereby said disc may be rotated to effect relatively slow changes in the weight of the glass charges delivered and to permit the operation of the feeder and the fabricating machine at their proper rate.

19. The method of regulating the weight of glass charges delivered by a glass feeder, which method comprises making relatively rapid changes in the weight of the glass delivered by changing the operating speed of said feeder to maintain the charges of proper weight, applying heat to the glass in the feeder and maintaining the normal operating speed of the feeder by increasing or decreasing the amount of heat applied to the glass in the feeder to make relatively slow changes in the weight of the glass delivered when the operating speed has increased or decreased substantially two per cent from the desired operating speed, whereby the changes in speed for correcting the weight of the glass as a result of the change in temperature will bring the feeder back to its normal operating speed.

20. The method of regulating the weight of glass charges delivered by a glass feeder, which method comprises maintaining the phase relationship of the operations of the several feeder mechanisms substantially constant, making relatively rapid changes in the weight of the glass delivered by changing the operating speed of said feeder, applying heat to the glass in the feeder, and maintaining the normal operating speed of the feeder by increasing or decreasing the amount of heat applied to the glass in the feeder to make relatively slow changes in the weight of the glass delivered when the operating speed has increased or decreased materially from the desired operating speed so that the changes in the speed of the machine necessary for correcting for the change in temperature will bring the operating speed back to normal.

21. The method of feeding glass charges of substantially constant weight, which method comprises regulating the speed of the feeder and the fabricating machine to control the weight of the charges delivered and when the speed varies a predetermined amount from the normal or desired speed, changing the temperature of the glass so that the speed of the feeder may be brought back to the normal operating speed.

22. The method of maintaining proper operating conditions in the molten glass of a glass feeder which would normally deliver charges of glass varying in weight from time to time, which method comprises maintaining the same phase relationship between the several operating parts of the feeder, maintaining the weight of the glass charges delivered substantially constant by changing the speed of the feeder, and changing the temperature of the molten glass when the speed of the feeder varies a predetermined amount from the normal speed.

23. In a device of the class described, the combination of a glass feeder adapted to deliver charges of molten glass, a fabricating machine, a common driving mechanism for said fabricating machine and said feeder, devices for regulating the weight of the charges delivered by the feeder comprising a pair of rheostats connected in series and having different graduations for accurately controlling the speed of said common drive in small increments to regulate the weight of glass delivered within prescribed limits of variation.

24. The method of maintaining proper operating conditions in the molten glass of a glass feeder which would normally deliver charges of glass varying in weight from time to time, which method comprises maintaining the weight of the glass charges substantially constant by changing the speed of the feeder, and changing the temperature of the glass in small increments in accordance with changes in the feeder speed.

25. In a device for manufacturing glass articles of substantially uniform weight, the combination of a glass feeder adapted to deliver charges of molten glass, a fabricating machine adapted to receive the charges delivered by said feeder, interconnecting means for driving said feeder and said fabricating machine at the same speed and phase relationship, devices for regulating the weight of the glass charges delivered comprising a motor for operating said feeder and said fabricating machine, a pair of rheostats in series and operatively connected to the motor circuit for making incremental changes in the speed of the motor and in the speed of the fabricating machine to increase and decrease the weight of the charges delivered by incremental amounts and thereby maintain the weight of the charges delivered by the feeder substantially constant.

26. In a device of the class described, the combination of a feeder for delivering glass to a fabricating machine, a fabricating machine, a drive for said feeder and said fabricating machine, devices for regulating the weight of the charges of glass delivered comprising a rheostat with relatively large resistance steps and a rheostat in series therewith having relatively small resistance steps for accurately controlling the speed of said drive in small increments to regulate the weight of the glass charges delivered, a burner adapted to control the temperature of said glass, and means for controlling the flow of fuel to said burner to increase or decrease the temperature of the glass when the driving speed has varied a predetermined amount above or below the normal operating rate.

27. The method of feeding glass charges of substantially constant weight to fabricating machines, which method comprises maintaining the same phase relationship between the operation of the shears, needle and fabricating machine, maintaining constant weight of the charges delivered by making relatively small changes in the speed of said shears, needle and fabricating machine without changing their phase relationship, and maintaining the speed of the needle shears and fabricating machine substantially constant by changing the temperature of the glass to permit the speed to be brought back to normal when the speed has been changed a predetermined amount from the normal speed.

28. In a device of the class described, the combination of a feeder spout having an orifice therein, a needle mounted above said orifice, a threaded member substantially parallel to said needle, an arm attached to said threaded member for supporting said needle, means adapted to reciprocate said threaded member, a threaded column attached to said means for adjustably mounting said threaded member thereon to adjust the position of the needle supporting arm, a sleeve adapted to receive and support said means and to permit reciprocation thereof, a pair of shears for severing the glass below said orifice, a motor for operating said shears and reciprocating said needle, and a pair of rheostats operatively connected in series and operatively connected in the motor circuit to make small incremental changes in the speed of said motor to maintain the weight of the glass delivered by the feeder substantially constant by said changes in speed.

29. In a device of the class described, the combination of a feeder spout having an orifice therein, a needle mounted above said orifice, a threaded member substantially parallel to said needle, an arm attached to said threaded member for supporting said needle, means adapted to reciprocate said threaded member, a threaded column attached to said means for adjustably mounting said threaded member thereon to adjust the position of the needle supporting arm, a sleeve adapted to receive and support said means and to permit reciprocation thereof, a pair of shears for severing the glass below said orifice, a motor for operating said shears and reciprocating said needle, a pair of rheostats operatively connected in series and operatively connected in the motor circuit to make small incremental changes in the speed of said motor to maintain the weight of the glass delivered by the feeder substantially constant by said changes in speed, a burner for applying heat to the glass in said feeder spout, a disc having a series of accurately gauged apertures therein for controlling the fuel fed to said burner to permit small incremental changes in the temperature of the glass for maintaining the speed of the feeder operation substantially constant by changing the temperature of the glass when the speed has increased or decreased a predetermined amount.

WILLIAM L. McNAMARA.